United States Patent
Miller (12)

(10) Patent No.: US 6,432,149 B1
(45) Date of Patent: Aug. 13, 2002

(54) BURNER-FEED MULTI-ZONE MOLTEN METAL SYNGAS GENERATOR

(75) Inventor: Charles B. Miller, Ashland, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 1195 days.

(21) Appl. No.: 08/795,878

(22) Filed: Feb. 6, 1997

Related U.S. Application Data

(63) Continuation of application No. 08/459,452, filed on Jun. 2, 1995, now abandoned.

(51) Int. Cl.[7] .............................. B01J 7/00; B01J 7/02; C10B 1/00
(52) U.S. Cl. ................... 48/92; 48/61; 202/219
(58) Field of Search ............... 48/92, 197 R, 48/206, 209, 210, 203, DIG. 2, DIG. 4; 423/418.2, 650; 588/900; 202/219; 266/160, 221, 222, 267, 270

(56) References Cited

U.S. PATENT DOCUMENTS

| | | | | |
|---|---|---|---|---|
| 2,031,987 A | * | 2/1936 | Sullivan, Jr. ............... | 48/92 |
| 3,690,808 A | * | 9/1972 | St. Pierre ............... | 431/4 |
| 4,388,084 A | * | 6/1983 | Okane et al. ............... | 48/92 |
| 4,527,997 A | * | 7/1985 | Espedal ............... | 48/86 R |
| 4,565,551 A | * | 1/1986 | Okane et al. ............... | 48/92 |
| 4,681,599 A | * | 7/1987 | Obkircher ............... | 48/92 |
| 5,069,715 A | * | 12/1991 | Reid ............... | 266/186 |
| 5,435,814 A | * | 7/1995 | Miller et al. ............... | 48/92 |

FOREIGN PATENT DOCUMENTS

| | | | | |
|---|---|---|---|---|
| DE | 2521080 | * | 11/1975 | ............... 48/92 |
| GB | 2189504 | * | 10/1987 | |

* cited by examiner

Primary Examiner—Marian C. Knode
Assistant Examiner—Alexa A. Doroshenk
(74) Attorney, Agent, or Firm—Richard D. Stone

(57) ABSTRACT

A gas impermeable vessel carrying a molten metal bath within the vessel bottom includes a downwardly directed baffle from a top wall of the vessel, which penetrates the bath to separate the vessel into a burner feed chamber and an outlet chamber with gas spaces above the level of the molten metal bath. A burner having a combustion chamber receiving an oxidant under pressure and fuel gas and pitch, combusts the pitch and passes the products of combustion at high velocity through a nozzle which opens directly or indirectly to the gas space above in the burner feed chamber such that a stream of carbon soot impinges against the surface of the molten metal bath and penetrates the same, thereby dissolving the carbon soot and disassociating gases such as carbon monoxide in the molten metal. Water may be supplied to the stream to effect disassociation of the hydrogen content in the molten metal. The molten metal passes under the baffle and gases such as CO and $H_2S$ exit an outlet line open to the gas space above the outlet chamber. $H_2O$ may be added to the outlet gas to effect a water gas shift $CO+H_2O \rightarrow CO_2+H_2$. The burner may be water jacketed with the water passing through apertures on the inner wall of the jacket into the stream exiting from the nozzle. The vessel may have its axis horizontal or vertical. The vessel may be formed by a ceramic U-tube or a ceramic tubular structure of W elevational configuration.

1 Claim, 8 Drawing Sheets

BURNER-FEED MULTI-ZONE MOLTEN METAL SYNGAS GENERATOR

This application is a continuation of application Ser. No. 08/459,452, filed Jun. 2, 1995 now abandoned.

CROSS-REFERENCE TO RELATED APPLICATIONS

U.S. patent application Ser. No. 542,234, filed Jun. 21, 1990 now abandoned; Ser. No. 625,350, filed Dec. 11, 1990 now abandoned; Ser. No. 838,642, filed Feb. 20, 1992 now U.S. Pat. No. 5,984,985; and Ser. No. 763,097, filed Sep. 20, 1991 now abandoned; all relate to the general field of the present invention.

BACKGROUND OF THE INVENTION

1. Field of the Invention

The present invention relates to the general field of molten baths for the disassociation of material containing carbon, and preferably hydrogen as well, generally classified in U.S. Patent Office, Class/Subclass: 60/39.12, 48/195, and 23/230A.

2. Description of the Prior Art

U.S. Pat. No. 4,187,672 and 4,244,180 to Rasor teach feeding a mass of carbonaceous fuel; e.g., coal, into a high temperature liquid; e.g., molten iron, at a temperature high enough to carbonize the feed; e.g., near 2850° F. (1565° C.) and introduces air or other oxygen source into the reactor to react with carbon dissolved in the liquid and uses the hot fuel gas to produce useful energy. At least one baffle is employed to separate the reactor chamber into two distinct zones.

WO 9Z/01492 to Nagel teaches two immiscible zones (layers) of different molten metal temperatures.

Hayes U.S. 4,338,096 teaches methods for controlling the flow of a molten-mass reaction medium into a reaction zone by utilizing a gas-lift effect on the molten medium and apportioning the flow of control gas to the desired flow of molten medium. Hayes is not directed to the introduction of a high velocity stream of soot by combusting a fuel and air mixture plus pitch in a burner to create the high velocity of stream of soot and in which $H_2O$ may be added to the high velocity stream impacting the molten metal within a pressure vessel, with the soot being driven downwardly into the molten medium.

Bach U.S. Pat. No. 4,574,714 and U.S. Pat. No. 4,602,574 do not suggest the plural zones of the present invention with soot feed introduced into one zone by discharge at high velocity from a burner and an oxidizer introduced into a second zone, and with the vapor phases and liquid phases of the two zones being separated by barriers as in the present invention.

Tryer U.S. Pat. No. 1,803,221 teaches production of hydrogen from methane in a two-zone unit, but fails to suggest the utilization of a burner combusting a fuel and air mixture plus pitch and discharge through a restriction or nozzle as a stream of soot penetrating beneath of level of the molten metal within the underlying pressure vessel or reactor.

SUMMARY OF THE INVENTION

The present invention is directed to an improved molten metal hydrogen generation bath in which a closed pressure vessel is provided with one or more baffles separating the vessel vapor space near the center of the bath into a burner feed chamber and a generated gas outlet chamber. one or more top mounted burners on the pressure vessel opening into the top of the vessel are provided with an oxidant feed such as $O_2$ or air, fuel gas and pitch, or other low-valued hydrocarbon for recycling, plus $H_2O$. The burner or burners discharge soot under high pressure through a venturi nozzle as a high velocity stream which impinges against the surface of the molten metal bath to drive the soot down into the molten metal. The soot dissolves in the molten metal and the high velocity stream includes $CO_2$ and $H_2O$ which dissolves in the metal. Circulation of the molten metal under the baffle(s) into the gas outlet chamber produces $H_2$ and $CO_2$ recoverable for fuel gas or synthetic purposes.

DETAILED DESCRIPTION OF THE PREFERRED EMBODIMENTS

Figure 1:
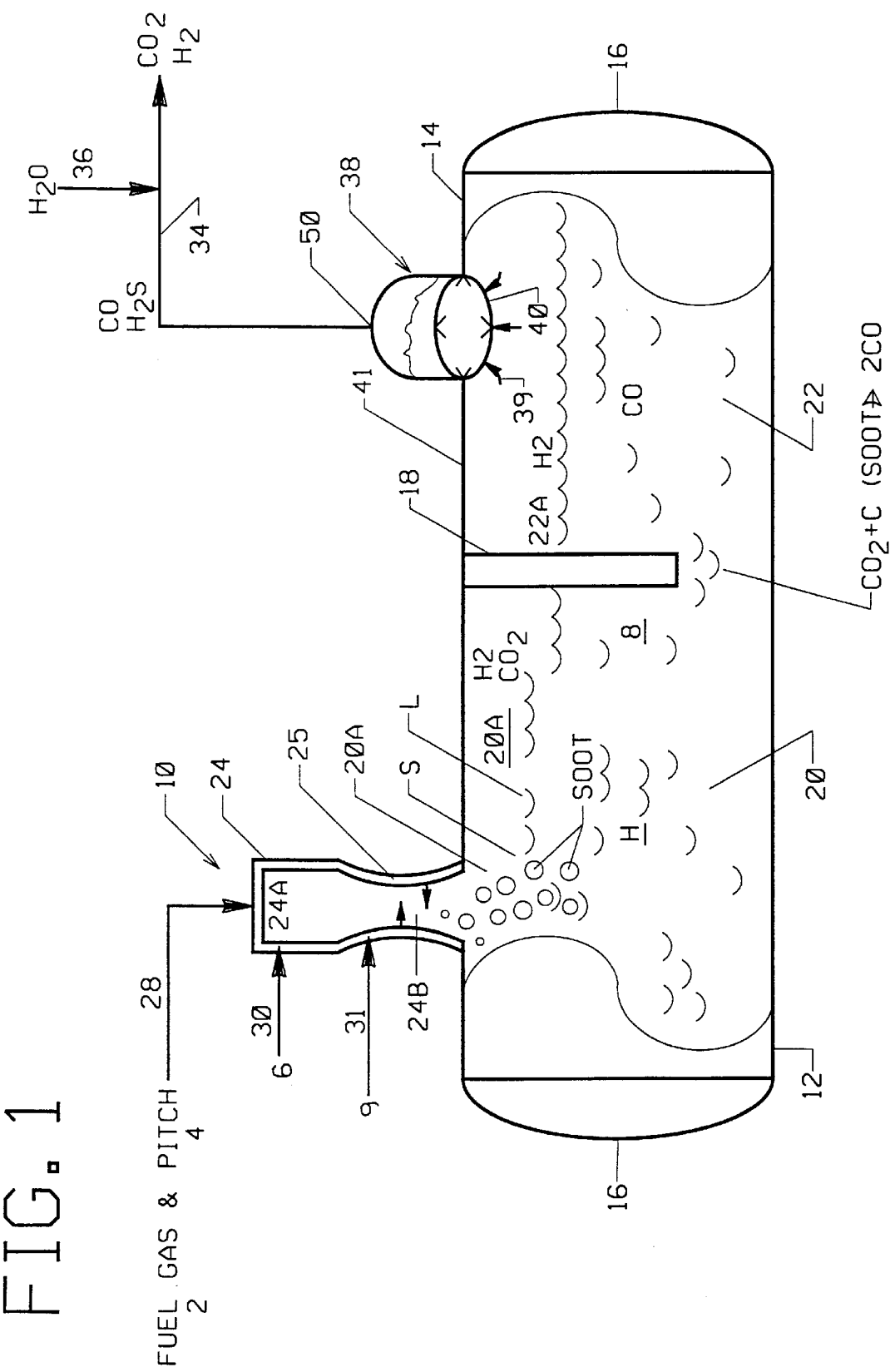
FIG. 1 is a schematic view of a pressure vessel or reactor mounting a vertical axis burner for discharge of the products of combustion of a fuel and air mixture plus soot from pitch or the like as a high velocity stream downwardly into the molten metal within the reactor and forming a preferred embodiment of the invention.

Referring to FIG. 1, a burner-feed, two-zone molten metal syngas generator is indicated generally at 10 and forms a preferred embodiment of the invention. The generator comprises principally a pressure vessel or reactor indicated generally at 12, and an internal burner 24, in this embodiment mounted physically at the top 12A of the vessel 12 defined by an elongated, horizontal cylinder 14 closed at opposite ends by end walls 16. The burner 24 and the vessel 12 may be formed of a suitable metal such as cast iron, steel or the like, and the vessel 16 may be lined with brick or castable refractories and may be prestressed to maintain the refractories in compression, even when the pressure vessel 12 is pressurized and hot. The axis of the burner 24 is at right angles to the longitudinal axis of the vessel 16 and the burner is provided with a combustion chamber at the top at 24A, and a venturi nozzle or restriction 24B at the bottom. The burner 24 may be provided with a water jacket 25. The venturi nozzle portion 24B opens directly to the interior of the pressure vessel via a nozzle discharge outlet 26. A downwardly extending baffle 18 fixed to the interior of the cylinder 14 and being of a length so as to penetrate beneath the surface level of a molten bath 8 separates the interior of the vessel 12 into a burner feed chamber 20 to the left and an outlet chamber 22 to the right. The baffle 18 may be made of refractory materials or of tungsten, tantalum or other high melting refractory metal which may be coated with refractory ceramics. A vapor zone 20A is defined to the left of the baffle 18 and above the level of the molten metal 8 and a vapor recovery zone 22A above the same molten metal within outlet chamber 22. The burner 24 is supplied with a fuel gas 2 and a pitch 4 via a feed line 28, while separately an oxidant such as $O_2$ or air 6 is provided via line 30 to the combustion chamber 24A of the burner 24. The fuel gas, pitch and oxygen may be mixed prior to entry to the interior of the combustion chamber 24A. In this invention, preferably a supply of water $H_2O$ at 8 is provided via line 31 to the products of combustion passing through the narrowed nozzle 24B, with the high velocity stream of soot indicated by particle S, which soot stream impinges against the surface layer of the molten metal 8 and penetrates the same. At the top 12A of the pressure vessel or reactor 12, on the outlet chamber 22 side of the apparatus, there is provided a disengaging chamber 38 which rises upwardly from the top of cylinder 14 and which is open at the bottom to the interior of the vapor recovery zone 22A. A ring 40, supplied with a source of water via line 39, generates steam upon exiting the ring at the bottom of the disengaging chamber. The top of the disengaging chamber is connected at 50 to a gas outlet line 34 through which carbon monoxide and hydrogen sulfite passes. A source of water at 36 feeds to line 34, which effects a water gas shift: $CO+H_2O \rightarrow CO_2+H_2$ creating the desired products of the syngas generator 10.

In operation, as a result of the burner produced soot 5, which is driven down at high velocity into the molten metal, the soot 5 dissolves plus $CO_2$ and $H_2O$, which dissociate in the molten metal 8. The molten metal may be iron or other suitable molten medium. The circulation of the molten metal 8 under the baffle 18 into outlet chamber 22 from burner chamber 20 produces $H_2$ and CO, which is recoverable for fuel gas purposes or synthesis. While iron is preferred as the molten medium, for specialized applications copper, zinc, especially chromium, manganese, or nickel, or other meltable metal in which carbon is somewhat soluble, may be used alone or in a mixture. While the invention is described with respect to a solvent de-asphalted pitch (SDA), natural gas ($CH_4$), liquified petroleum gas (LPG), propane, petroleum naphtha, light or heavy distillate, vacuum or other residues, aromatic extracts, FCC slurry oil, trash garbage, tires, coal and virtually any other hydrocarbon-containing material may be substituted for pitch 4, FIG. 1.

While the products in the apparatus of FIG. 1 and in the example following herein are preferably CO, $CO_2$, $H_2$, plus sulfur and other contaminants in the feed which may be outputted in the slag which can be periodically drained off, may be separated and removed. In refineries, sulfur is preferably outputted as gas in the hydrogen stream and is then treated conventionally by the Claus process and the SCOT (Shell Claus Offgas Treatment) unit.

Conventional analog or digital controls are used, measuring temperature, preferably with optical or infrared pyrometer or protected thermocouple; carbon by spectrometer; level by nuclear radiation and admitting feed, $CH_3$, $CO_2$, $H_2O$ to maintain temperature, which must, of course, be high enough (e.g., at least 1,250° C. in feed chamber 20, 1,300° C. in outlet chamber 22) to maintain the particular metal carbon composition liquid and dissolved carbon level and $H_2$ production within preset limits. Temperature is preferably 1,150° C. to 1,600° C., more preferably 1,250° C. to 1,500° C., and most preferably 1,300° C. to 1,450° C. in the feed zone, and usually preferably 50° C. to 150° C. higher in the oxidation zone.

While the example set forth herein describes the invention on a continuous basis, it may, of course, be practiced on a batch or semi-batch basis with discontinuous flows of starting materials into the molten-metal vessel and with intermittent withdrawal of slag and/or product gases.

Wide ranges of feed rate, feed composition, and contaminants can be accommodated, even wide swings over short time intervals.

The present invention is useful for the production of a wide variety of end-products, including all those which can be produced by the well-known Fischer-Tropsch process, e.g., naphthas, diesel fuel, jet fuel (kerosene), as particularly commercialized by Saso in South Africa. The Mobil "M-Gas" process (U.S. Pat. No. 3,998,899, etc.) may be employed. At the present time, the intention will be particularly valuable for the flexible production of reformulated fuels as mandated or as desirable for protection of the environment, e.g., methanol, methyl tertbutyl ether (MTBE) and tert amyl ether (TAME), etc. In its preferred embodiments, the invention functions entirely from distress or low-valued hydrocarbons, air (for oxidation), and water (to supply hydrogen and additional oxygen). It is particularly noteworthy that the invention can utilize the exothermic carbon oxidation reaction so that it can function without need for external energy input. Additionally, the endothermic Boudouard reaction ($CO_2+C \rightarrow 2CO$) can be used to control temperature within the two reaction zones, and particularly to control the differentials so as to adjust convection circulation of materials between the zones as desired.

Syngas uses, per Kirk-Othmer, $CO/H_2$ without any other reactants as building blocks, e.g., glycol synthesis, modified Fischer-Tropsch syntheses to olefins or waxes, and acetic acid synthesis; those involving $CO/H_2$ and employed to make additional use of compounds derived from synthesis gas, e.g., homologation of methanol to ethanol; those that use a derivative based on $CO/H_2$, e.g., methanol, as a starting material for a further reaction sequence, e.g., Mobil's MTG (methanol to gasoline) process or the vinyl acetate process; and energy-efficient processes, e.g., those that make syngas for use in combined-cycle plants; and those that use the carbon monoxide for subsequent syntheses, e.g., of acetic anhydride, acrylates, Koch acids, etc.

Figure 2:
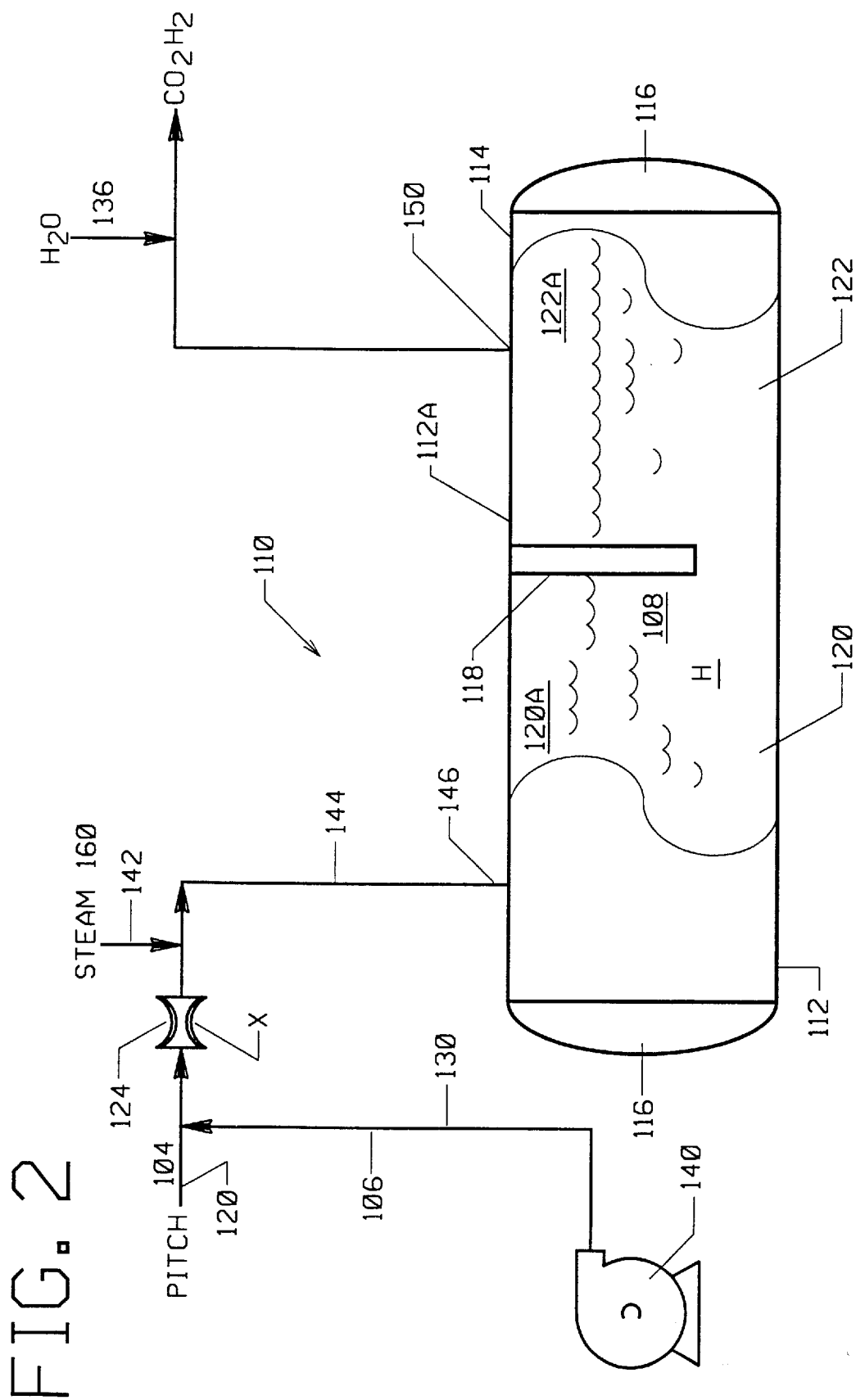
FIG. 2 is a modified multi-zone molten syngas generator similar to that of FIG. 1, with the soot stream discharging from the burner horizontally and diverted into a downwardly directed steam prior to entering the pressure vessel and forming a second embodiment of the invention.

FIG. 2 in this embodiment of a burner feed two-zone molten metal syngas generator indicated generally at 110 and forming a further embodiment of the invention, the reactor or pressure vessel 112 is identical to that of FIG. 1, however, the burner is not mounted to the top of the pressure vessel, but is positioned at some distance above the same and its axis is horizontal rather than vertical. In the apparatus of FIG. 2, the elements are numbered similarly to those in the first embodiment of FIG. 1, but designated by an order of magnitude of one hundred. The differences reside in the position and orientation of burner 124, whose axis X is oriented horizontally so as to discharge a high velocity stream of soot from the nozzle portion 124B of the burner, discharging through a line 144, which opens at point 146 within the top 114A of the cylinder wall 114 of the pressure vessel or reactor 112. A source of steam is fed into the products of combustion including the soot exiting from burner 124 via line 144, through a feed 142. Line 128 supplies pitch 104 to the burner 124, which mixes with a source of air or $O_2$ 106 from an air compressor 140 via line 130. The action and sequence of operation and products produced are identical to that within the embodiment of FIG. 1.

Figure 3:
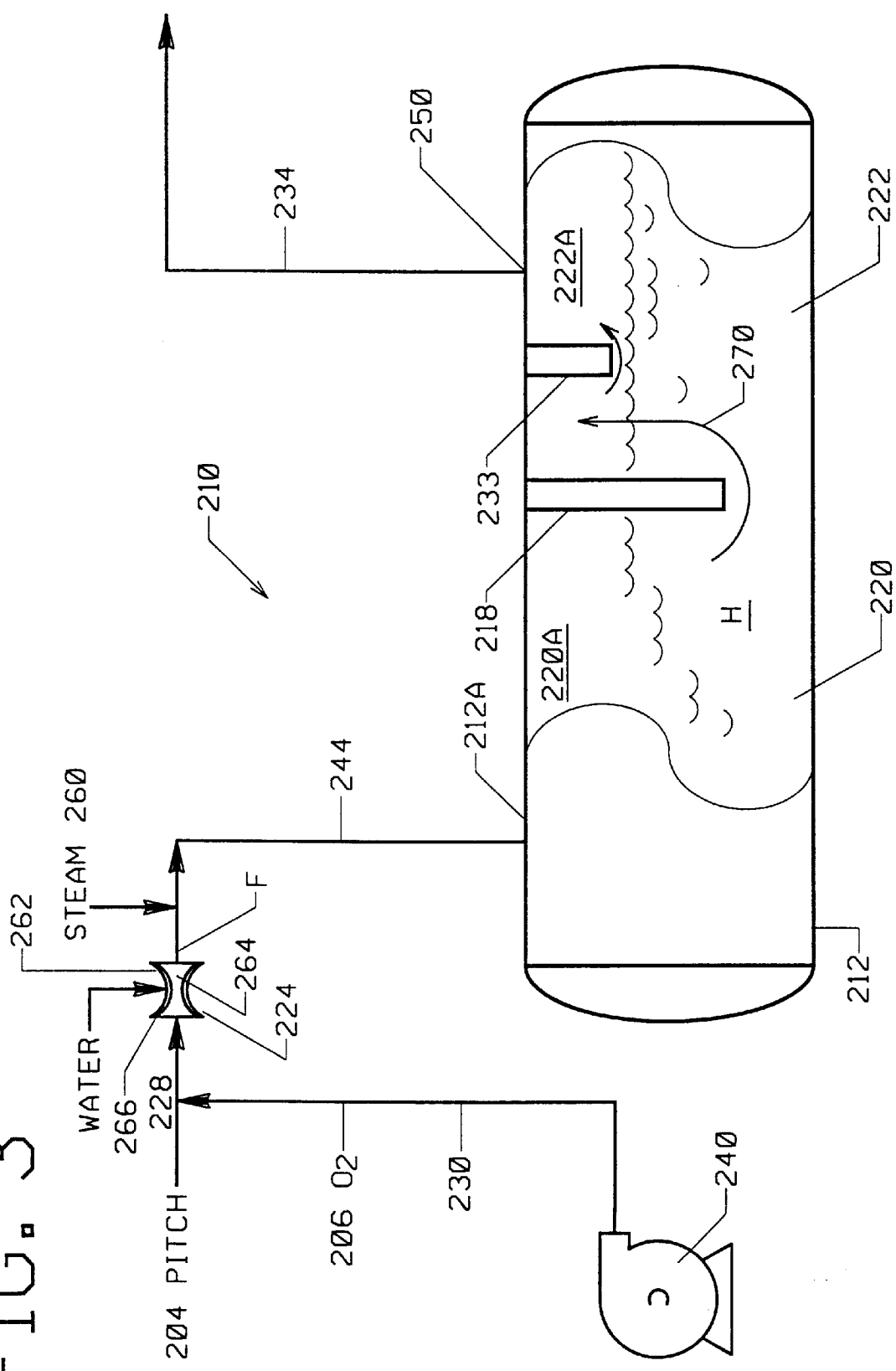
FIG. 3 is a schematic view of the system of FIG. 2 modified to provide a water cooled burner and to add a supplemental vapor baffle within the reactor downstream of a first baffle penetrating beneath the surface level of the molten metal and forming a further embodiment of the invention.

In the embodiment of FIG. 3, where the like elements are renumbered as a two hundred series, FIG. 3 is seen as a modification of the embodiment of FIG. 2 with several changes. In FIG. 3, the burner 224 is provided with concentric double walls, an outer wall 262 and an inner wall 264 forming an annular chamber or cavity 266 therebetween, through which a flow of coolant such as water from a water source indicated at 290 flows, thereby improving the efficiency of the burner 224. In this embodiment, there is an additional short length vapor baffle 235 within the vapor portion 222A of the outlet chamber 222, extending downwardly from top 212A, but terminating above the level of the molten metal 208 within the reactor or pressure vessel 212. The baffle 235 separates contaminants of the off gases from the reactor entering vapor space 222A as per arrow 270 to the left of baffle 235, FIG. 3, with the off gases leaving at outlet 250 through line 234. In all of the embodiments, the molten metal 208 is iron Fe. Again, the operation, the pitch 204 and air components are identical to that of the embodiment of FIG. 2, as well as the products produced.

Figure 4:
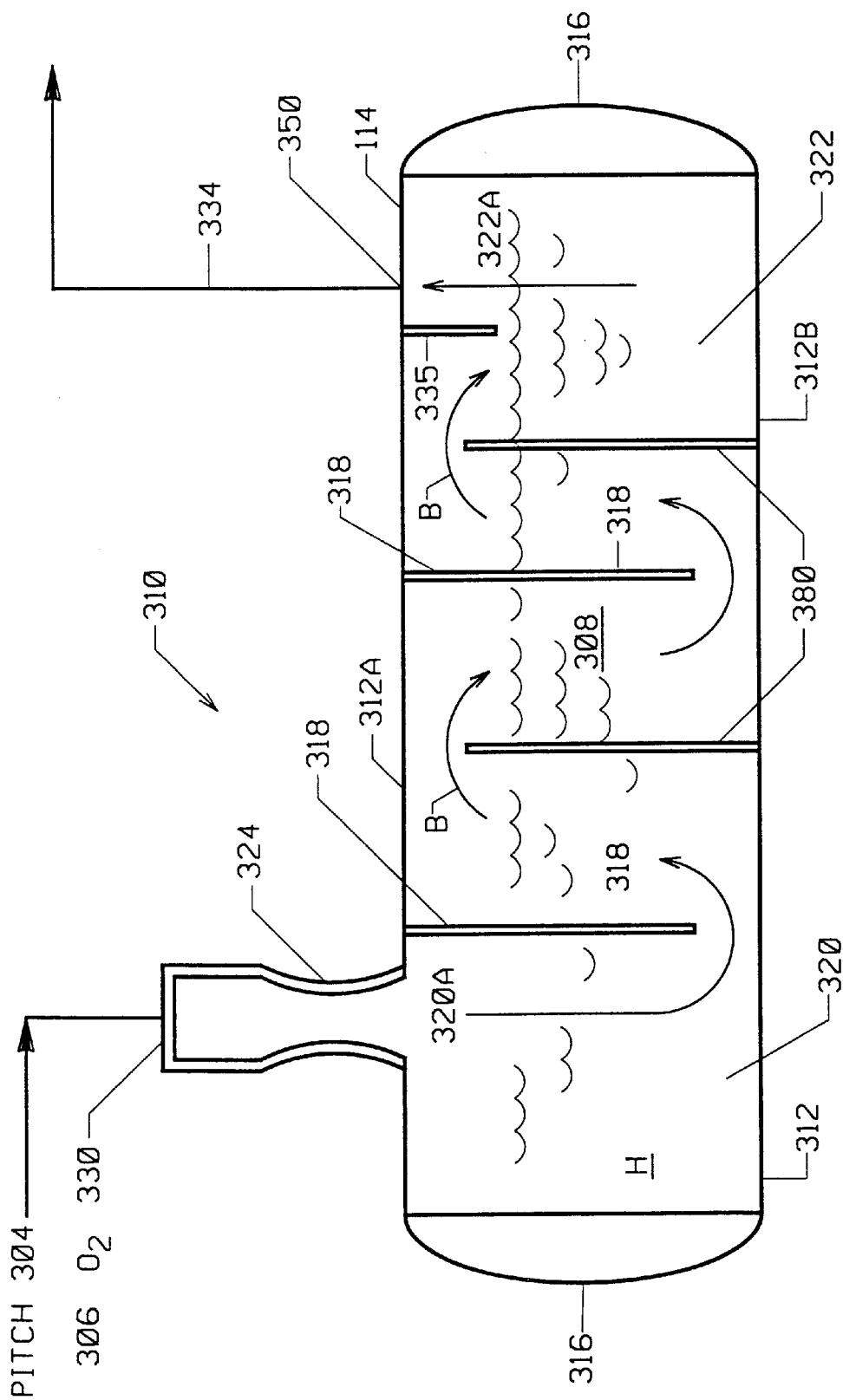
FIG. 4 is a schematic view of yet another embodiment of the invention, in which the pressure vessel is provided with a series of oppositely directed baffles penetrating the surface level of the molten metal and forming a tortuous passage for the vapors passing from the burner feed chamber to the most downstream vapor outlet chamber of the reactor.

Referring to FIG. 4, a modification of the first embodiment of FIG. 1 is shown and the content of that figure may be referred to for many of the details of the schematic representation of FIG. 4. FIG. 4 provides a series of downwardly projecting baffles from vessel top 312A as at 318, 318' and the short length downwardly projecting baffle 335 within the downstream outlet chamber 322 in contrast to the much longer length baffles 318 and 318' within the upstream chambers. Additionally, a pair of vertically upright baffles, which extend upwardly from vessel bottom 312B to at least the height of the molten iron bath 308 partially filling the interior of the vessel 212. As a result, as indicated by the arrows B, the gases or gases escaping from the molten iron bath 308 are required to take a torturous path prior to exiting from the outlet chamber 222, passing beneath the short length baffle 335 of the vapor space 322A and exiting at point 350, where the gas discharge conduit 334 connects to the pressure vessel 212. In all other respects, the operation of the embodiment and the products produced in FIG. 4 follow that of FIG. 1.

Figure 5:
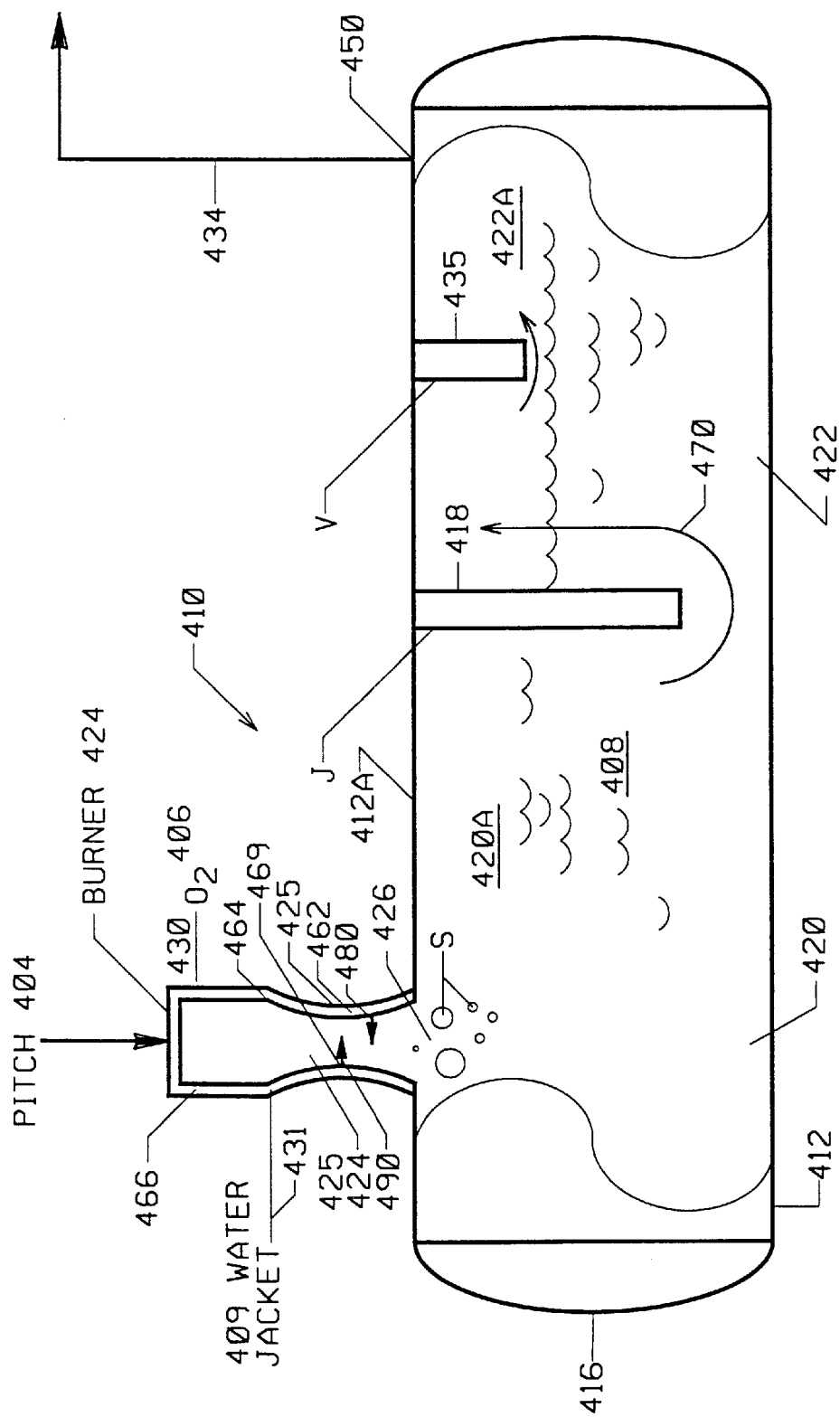
FIG. 5 is a schematic view of the multi-zone metal syngas generator of FIG. 1, employing an additional vapor baffle plate or barrier within the outlet chamber of the pressure vessel.

FIG. 5 illustrates a further modification of the apparatus of FIG. 1. In this embodiment, the elements numbered in a four hundred series include a short length baffle 435 within the vapor zone 422A of the outlet chamber 422 of pressure vessel or reactor 412. The burner feed two-zone molten metal syngas generator 410 in this embodiment is further characterized by a water cooled manifold or jacket 425 about the burner 424 with an oxidant ($O_2$) supply via line 430 fed to the combustion chamber 424A of the burner, mixing with pitch 404 and appropriate fuel gas, if required. The jacketed burner 424 is created by a spaced outer wall 462 separated from inner wall 464 and space 466 is supplied by a source 409 of water as per line 431. In this embodiment, ports as shown by the short length diametrically opposing arrows 480 within the venturi nozzle 424B portion of the burner 424, jets of water inject through small diameter perforations as at 468 into the stream of soots discharging downwardly into the molten iron 408 within the burner feed chamber 420 of pressure vessel 412. Depending baffle 435 from top 412A of the pressure vessel 412 acts to remove entrained, contaminant molten metal within the off gas vapors 470 within vapor space or portion 422A of the outlet chamber 422. Such action is the result as occurs in the utilization of short length baffles 235 of the FIG. 3 embodiment and at 335, FIG. 4. The feeds, reactions and recovered products in the embodiment of FIG. 5 are similar to those of the prior embodiments.

Figure 6:
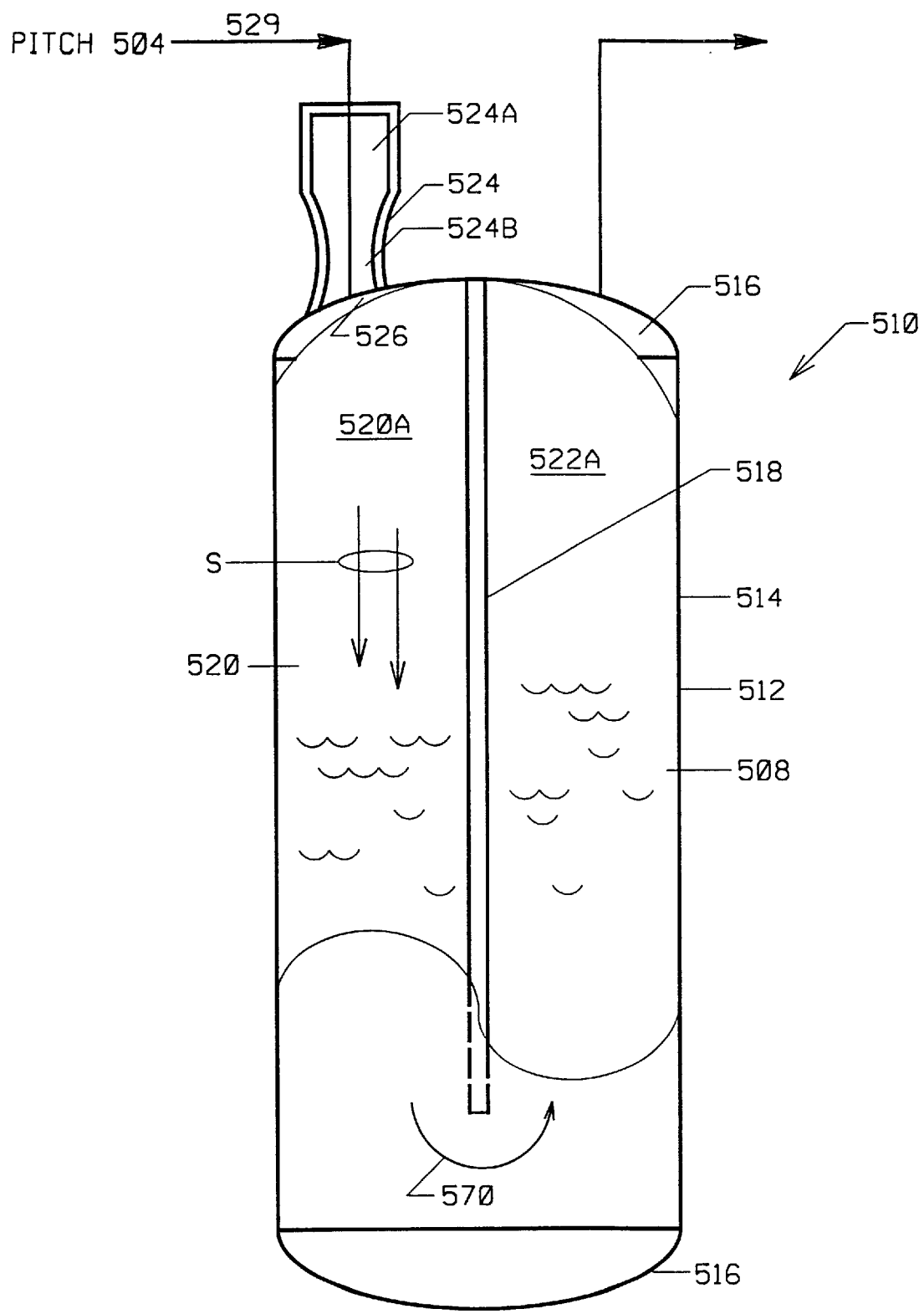
FIG. 6 is a schematic view of a further embodiment of the invention in which the pressure vessel has its longitudinal axis oriented vertically.

FIG. 6 shows a vertically upright reactor or pressure vessel 512 for the syngas generator indicated generally at 510, with common elements bearing five hundred series designations corresponding to those of the prior embodiments. The vertical axis vessel 512 is schematically shown and illustrates the basic components necessary for a proper operation under such orientation. A single feed line 528 is illustrated as feeding both pitch 504 and an oxidant 502 to the burner 524 with the burner composed of a combustion chamber 524A and a venturi nozzle or restriction 524B at its outlet. In this case, a high velocity soot stream indicated by arrows S emanates from the discharge end of the nozzle 524B and impinges against the surface of the molten iron bath 508 in a direction parallel to one side of a vertical baffle 518, parallel to the axis of the pressure vessel or reactor 512 outlet, at port or opening 526. Vapors 570 collect in the vapor portion 522A of the outlet chamber 522 and exit at connection 550 of products recovery line 534 within vessel 512 upper end wall 516. While the orientation of the vessel 512 is 90° from that of the prior embodiments, the mode of operation and products recovered are essentially identical to that as described with respect to the embodiments of FIGS. 1–5.

Figure 7:
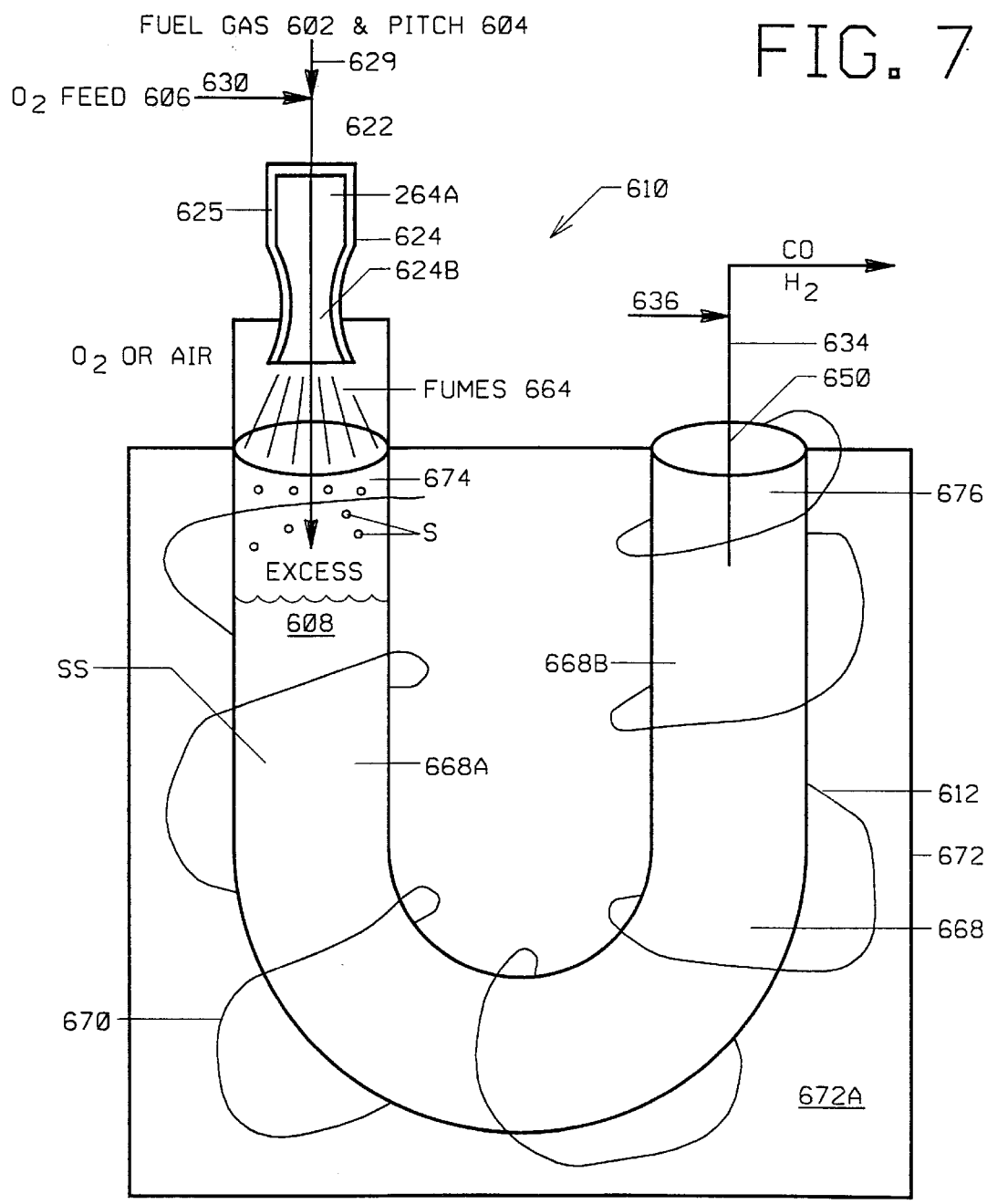
FIG. 7 is a schematic view of a multi-zone metal syngas generator of the present invention, utilizing a ceramic U-tube as a pressure vessel, about which is wound an induction heating coil for controlling the heat of the molten metal bath within the ceramic U-tube and forming a further embodiment of the invention.

FIG. 7 is directed to a burner feed two-zone molten metal syngas generator indicated generally at 610, with common elements corresponding to the FIG. 1 embodiment being similarly labeled within a six hundred numerical designation. The pressure vessel or reactor 612 consists essentially of a U-shaped ceramic hollow tube supported by an appropriate support structure or enclosure 672. Such may take the form of a complete enclosure about the ceramic U-tube 668 with the exception of exposed tube ends 674, 676. In this embodiment, an induction heating coil 670 is provided about the exterior of the ceramic U-tube 668. The interior 672A of the support or enclosure 672 may comprise a thermal insulation material. One or more induction heating coils 670 may provide for the initial heating of the molten metal bath such as iron (Fe) at 608, as well as intermittent heating during operation of the apparatus to maintain the temperatures favorable to the process.

In FIG. 7, end 674 of the ceramic tube supports a vertical axis burner 624, with a restriction at the end of the combustion chamber 624A taking the form of a venturi nozzle 624B, whose open end discharges the products of combustion or fumes 664 downwardly in the direction of the surface of molten Fe bath 608. The products of combustion include gases, as well as soot particles S, which impinge against the molten iron bath and are driven beneath the surface of the same due to the high velocity of the soot particles exiting from the venturi nozzle 624B. The burner 624 may be jacketed by jacket 625 to provide water cooling to the burner over the length of the same. Oxygen or air 606 feeds at 630 to a fuel, gas and pitch line 628, with the resulting mixture carried into the combustion chamber 624A by line 662. At the opposite end 676 of the ceramic U-shape 668, off gases CO and $H_2$ are taken at 650, the products being principally carbon monoxide and hydrogen via gas outlet line 634, as a result of introduction of water into line 634 via line 636. In the embodiment of FIG. 7, the inner walls 668A, 668B of the U-tube substitute for the baffle 18 in the FIG. 1 embodiment.

The feed materials to the burner, the production of a large volume of soot, the operating parameters and the products of this embodiment are essentially identical to that of FIG. 1 and as described in the example set forth below.

Figure 8:
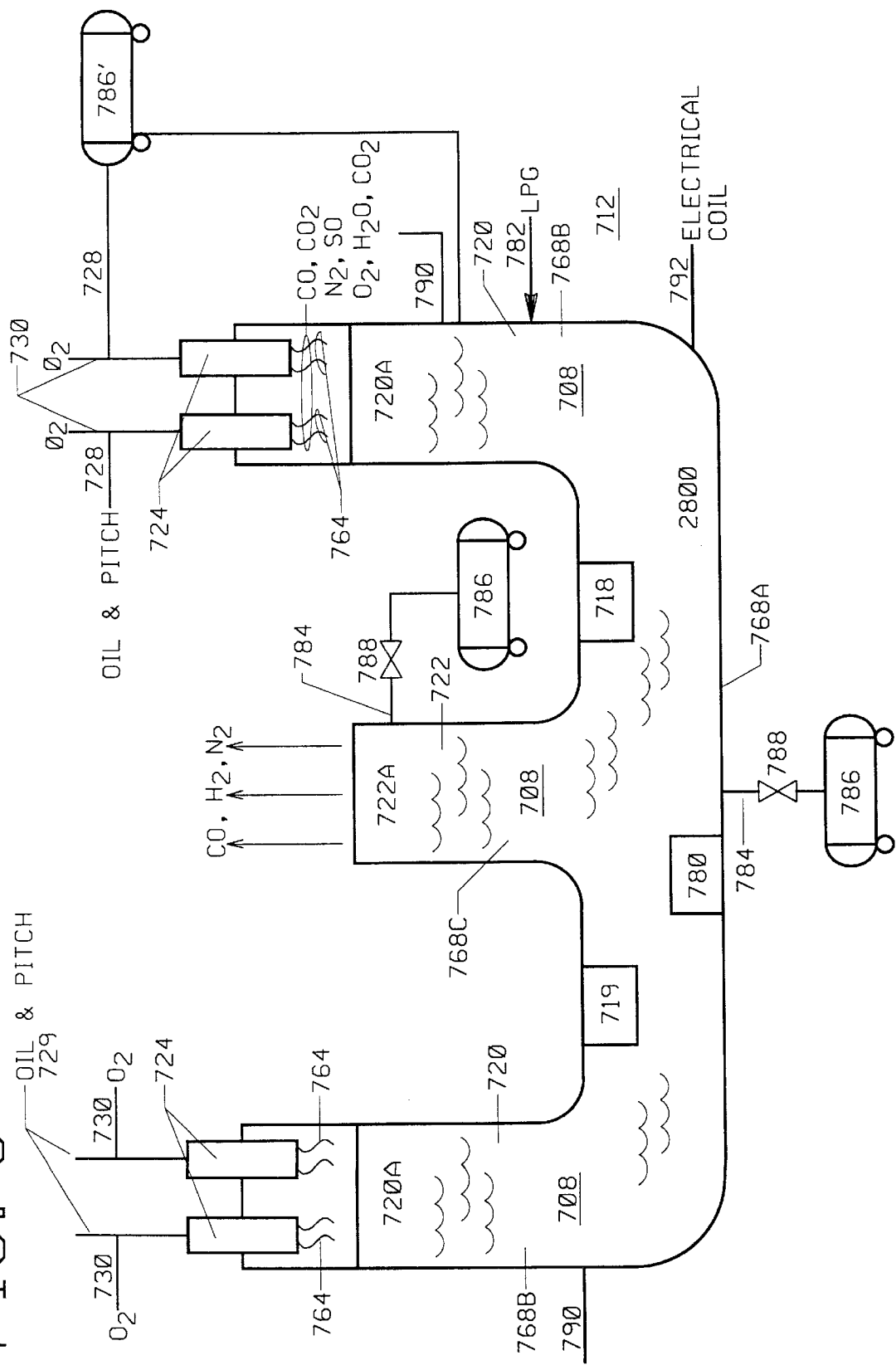
FIG. 8 is a schematic view of a multi-zone metal syngas generator incorporating a pair of burner-feed chambers at opposite ends of the pressure vessel, with a centrally located outlet chamber for releasing the hydrogen and other gases developed during operation of the generator.

Turning to FIG. 8, the burner feed two-zone molten metal syngas generator indicated generally at 710, in this embodiment, is a variation of that shown in FIG. 7. The elements employed therein to those of FIG. 1 bear similar numerical designations in a seven hundred series. A suitable support structure (not shown) supports a ceramic tube 768 configured in the form of a W, the ceramic tube 768 forming the principal element of the closed pressure vessel 712 including a horizontal base portion 768A, a pair of outer legs 768B and a central leg 768C. The outer legs form burner feed chambers 720, while the central leg 768C forms a single outlet chamber 722. The outer legs 768B of the ceramic tube structure support in this case a pair of vertically oriented, downwardly directed burners 724. In the schematic illustration of this figure, for simplicity purposes, only the oxygen or air lines 730 and the intersecting oil lines 728 are illustrated, providing a mixture of fuel and oxidant prior to combustion within the combustion chamber of the dual burners at each of the outer legs 768B. Pitch is fed along with the oil to the combustion chambers. The middle leg 768C acts as an outlet chamber for the gases such as carbon monoxide, hydrogen, nitrogen, or the like. At the outer legs 768B, the products of combustion 764 discharge from the nozzle or restriction ends of the burner 724 and exit at high velocity to penetrate the surface of the molten bath 708, preferably Fe. The products of combustion include carbon dioxide and water, where supplied in the manner of the embodiment of FIG. 1, which disassociate in the molten metal. The circulation of metal under to the central leg 768C is facilitated by the existence of downwardly projecting baffles 718 in the base 768A of the ceramic tube structure 768, along with a single vertically upright baffle 780 intermediate of the downwardly directed baffles 718.

The molten metal 708 may be heated by the introduction of a liquid petroleum gas (LPG) via line 782. Alternatively, the body of molten metal may be heated by the incorporation of an induction heating coil or a series of induction heating coils as at 792, in accordance with the embodiment of FIG. 7. Dual feed zones 720 are therefore provided for one outlet zone 722. In this embodiment, molten metal, e.g., steel, may be tapped from the molten metal bath 708 via taps 784 for filling wheeled transport containers 786, under control of valves 788. Similar wheeled containers 786' may be employed for providing the feed material such as SDA bottoms or oil to burners 724. The evolved gases discharging as products of combustion 764 from the burners 724 such as CO, $CO_2$, $N_2$, $SO_x$, $O_2$, $H_2O$ can be injected via lines into the molten metal bath for temperature control, partitioning of the $SO_x$ into the slag as desired.

EXAMPLE 1

Referring to FIG. 1, fuel gas 2 and a pitch 4 derived from a conventional solvent de-asphalting unit in a petroleum refinery is admitted to burner 24. The burner 24 is fed with air 6 under pressure to sustain combustion within the combustion chamber 24A. The exhaust gases are mixed with $H_2O$ at 8 in the form of steam to add substantial additional hydrogen ($H_2$) to the exhaust gas content of the products of combustion from burner 24.

The products of combustion include exhaust gases comprising $H_2O$, $CO_2$ and a substantial volume of carbon in the form of soot S produced by the combustion of the fuel gas and hydrocarbons in burner 24. The exhaust gases impinge upon the surface 8A of the molten iron bath 8 and penetrate beneath the surface thereof, to mix with the liquid iron Fe of the bath. The bath temperature is approximately 2,100°–3,300° F. (1,100°–1,800° C.) and the $H_2O$ is disassociated into $H_2$ and $CO_2$, formed by reaction with the excess carbon. These gases are under pressure and are forced from the vapor space 20A above the bath within the burner feed chamber 20, down into the bath 8 and flow with the bath under the baffle 18, which separates the burner feed chamber 20 from the outlet chamber 22.

The soot S dissolves in the molten iron bath 8 and also flows under the baffle 18 into the outlet chamber 20. The carbon dioxide reacts with the excess carbon in the form of soot to produce carbon monoxide in the outlet chamber 20. In the outlet chamber 20, gases evolve under the pressure from the burner 24 and exit the outlet chamber vapor space 22A by passing through steam ring 40 surrounding the upper outlet 50 defined by the disengaging chamber 38. The exiting gases comprise carbon monoxide (CO), $H_2$, and some HS because of sulfur impurities in the fuel gas 2 and/or pitch 4. These gases are mixed with additional quantities of $H_2O$ 8 in the form of steam to effect a water-gas shift reaction: $CO+H_2O \rightarrow CO_2+H_2$ which produces additional quantities of hydrogen as product and also produces $CO_2$ which can be compressed and sold, e.g., for enhanced oil recovery or beverage carbonation, etc. $H_2O$ can be used to first cool the burner via a water jacket about burner 24 and then be injected into the gases as jets of water or as steam from the cooling jacket into the products of combustion, discharging at high velocity from the venturi nozzle 24B at the downstream end of the burner combustion chamber 24A.

The same reaction can alternatively be conducted in the apparatus shown in FIG. 2 in which the burner nozzle is spaced above the burner feed chamber.

The same process can be conducted in the apparatus shown in FIG. 3 which uses a water cooled burner and which also injects steam into the exhaust gases. FIG. 3 involves an additional partial baffle which further reduces possibility of entrained metal from exiting the outlet chamber.

Similarly, the example process can be conducted in the apparatus of FIG. 4 which utilizes a burner similar to that of FIG. 1 but uses upwardly extending and downwardly depending alternate baffles to create a particularly tortuous path through the molten iron bath.

Still another apparatus in which the above process can be conducted is shown in FIG. 5 in which the integral water cooled burner B is combined with another secondary baffle.

FIG. 6 employs a vertically oriented container in which the burner feed chamber and the outlet chamber are each vertical in their configuration, though they function substantially the same as the configuration shown in FIG. 1. A vertical depending baffle separates the gas space between the outlet chamber and the burner feed chamber.

The process of the example can be conducted similarly in the U-tube configuration shown in FIG. 7. In this configuration, the facing inner walls of the U-tube substitute for the baffle shown in FIG. 1. The U-tube can be surrounded by one or more induction heating coils for initial or even intermittent heating, and the burner can be water cooled or not, mounted at right angles to, and spaced from, or integral with the burner feed chamber, or any of the other variations described above. The products and process conditions are generally as described above.

Lastly, referring to FIG. 8, a double feed chamber version of the embodiment of FIG. 7 is shown wherein the product-emitting leg of the two U-tubes are combined to form a configuration shaped much like a W as shown.

The operating parameters and the feed materials, as well as the product gases for all of the embodiments are similar, if not identical, to those of the embodiment of FIG. 1, and the single example set forth above holds for all of the embodiments described in detail within this specification.

As may be appreciated, the specific apparatuses and methods discussed herein are illustrative only of the invention. Variations of the apparatuses, methods or feed stock are readily apparent to a person of skill in the art based upon the teachings of this specification and are therefore intended to be included as part of the invention disclosed herein.

Reference made above to any patent or application specification or literature is intended to result in such patent applications, patents or literature being expressly incorporated herein by reference including any patents or other literature references cited within such applications, patents or literature.

What is claimed is:

1. In a molten metal bath apparatus for decomposing carbon and hydrogen-containing feed and producing hydrogen, said apparatus comprising:

a gas-impermeable vessel having, a molten metal bath within the bottom of said vessel, means for defining a feed chamber within said vessel for dissolving carbon from said feed, an outlet means defining an outlet chamber within said vessel, a gas phase said molten metal bath, a baffle means within said vessel having a lower portion in said molten metal bath and separating said feed chamber from said outlet chamber; the improvement comprising:

a burner within said vessel having a combustion chamber opening through a nozzle at one end of said burner, means for supplying an oxidant under pressure to said combustion chamber, means for supplying said carbon and hydrogen containing feed to said combustion chamber for combustion under pressure in said burner and for discharging products of combustion under pressure including carbon soot from said combustion chamber through said nozzle as a high velocity stream and means for directing said high velocity stream into said vessel, against said molten metal bath for causing penetration of said carbon soot therein, wherein said products of combustion further include at least $CO_2$ and wherein said soot dissolves in said molten metal and said $CO_2$ disassociates in the molten metal; molten metal circulates under said baffle means into the outlet chamber and therein produces $H_2$ and CO recoverable for fuel gas or synthesis purposes, wherein said vessel is of upright U-shape in elevation having walls, wherein said burner is mounted to one end of said U-shaped vessel, with the nozzle thereof opening inwardly of the vessel, downwardly and discharging the products of combustion vertically downwardly so as to penetrate the surface of said molten metal bath in tile bottom of the vessel, wherein an opposite end of said U-shaped vessel has coaxially coupled thereto a gas outlet line, and wherein the walls of said U-shaped vessel constitute said baffle means.

* * * * *